United States Patent Office 3,214,488
Patented Oct. 26, 1965

3,214,488
COMPOSITION COMPRISING POLYMETHYL ETHER OF POLYMETHYLOL MELAMINE AND COPOLYMER OF OLEFIN AND CARBOXYL MONOMER
David V. O'Donnell, Stamford, and Tzeng Jiueq Suen, New Canaan, Conn., assignors to American Cyanamid Company, New York, N.Y., a corporation of Maine
No Drawing. Filed Aug. 24, 1961, Ser. No. 133,551
9 Claims. (Cl. 260—854)

This invention relates to a novel composition of matter and more particularly to a composition of matter capable of producing glossy, continuous films having excellent hardness, chemical resistance, impact resistance and flexibility. Further, this invention relates to a novel composition of matter comprising a physical mixture of (1) a water-soluble potentially thermosetting polymethyl ether of a polymethylol melamine and (2) a water-soluble salt of a polymer of (a) an olefinic hydrocarbon having from 2 to 18 carbon atoms, (b) an $\alpha,\beta$-ethylenically unsaturated acid or anhydride thereof, (c) with or without a different monoethylenically unsaturated compound copolymerized therewith. Still further, this invention relates to novel coating compositions which produce glossy films of outstanding properties in spite of the fact that they draw down from aqueous dispersions of a mixture of resinous materials.

One of the objects of the present invention is to prepare novel compositions of matter which are capable of producing glossy, continuous films having exceptional hardness, chemical resistance, impact resistance and flexibility.

Another object of the present invention is to prepare a novel composition of matter comprising (1) a water-soluble potentially thermosetting polymethyl ether of a polymethylol melamine and (2) a water-soluble salt of a polymer comprising (a) an olefinic hydrocarbon having from about 2 to 8 carbon atoms, (b) an $\alpha,\beta$-ethylenically unsaturated acid or anhydride thereof, (c) with or without a different monoethylenically unsaturated compound copolymerizable therewith.

A further object of the present invention is to produce a coating composition which has greater utility in the coating art because of the fact that it is prepared in an aqueous solution, thereby permitting the use thereof without running the risk of significant fire hazard, which risk is usually present when expensive organic solvents are employed.

These and other objects will become more apparent to those skilled in the art upon reading the more detailed description set forth hereinbelow.

In the preparation of the water-soluble polymers used in the composition of the present invention, one of the essential components is an olefinic hydrocarbon having from about 2 to 8 carbon atoms. This class of olefins includes such compounds as ethylene, propylene, butylene, isobutylene, amylene, hexene, heptene, octene, diisobutylene and the like. It is also within the purview of the instant invention to use combinations of these olefins.

As a second component of the water-soluble polymers used in the composition of the present invention are the $\alpha,\beta$-ethylenically unsaturated carboxylic acids. This class of components includes not only the monocarboxylic acids but the polycarboxylic acids as well. The term "$\alpha,\beta$-ethylenically unsaturated carboxylic acids," as used herein, includes not only the monocarboxylic acids and polycarboxylic acids per se but also the anhydrides and partial alkyl esters of the polycarboxylic acids wherein the alkyl group contains from about 1 to about 18 carbon atoms.

Amongst the monocarboxylic acids which may be used to prepare the polymers used in the composition of the present invention are such acids as acrylic, $\alpha$-benzyl acrylic, methacrylic, cinnamic, crotonic and the like. Amongst the $\alpha,\beta$-ethylenically unsaturated polycarboxylic acids which may be used in the preparation of the polymers used in the composition of the present invention are maleic acid, fumaric acid, itaconic acid, mesaconic acid, aconitic acid and the like. As mentioned above, the anhydrides and partial alkyl esters of these polycarboxylic acids may also be used whenever possible. Examples of the anhydrides useful in the polymer used to prepare the composition of the present invention include maleic anhydride and the like. Examples of the partial alkyl esters of the polycarboxylic acids include monobutyl maleate, monooctyl fumarate, monomethylmesaconate and the like. These acids, anhydrides and partial alkyl esters may obviously be used singly or in combination with one another.

There are certain other monoethylenically unsaturated compounds which may constitute a third component of the polymer and which are copolymerizable with those monomers mentioned above. This third compound may or may not be used in forming the polymers of the $\alpha,\beta$-unsaturated carboxylic acids and the olefinic hydrocarbons of 2 to 8 carbon atoms. Included in this group of components are such compounds as the alkyl esters of $\alpha,\beta$-unsaturated carboxylic acids, such as methyl acrylate, ethyl acrylate, propyl acrylate, butyl acrylate, octyl acrylate, decyl acrylate, lauryl acrylate, methyl methacrylate, ethyl methacrylate, butyl methacrylate, heptyl methacrylate, decyl methacrylate, propyl crotonate, butyl crotonate, nonyl crotonate, dimethylitaconate, dihexylmesaconate, dibutyl maleate, dioctyl fumarate and the like.

Also includable in the group of compounds copolymerizable with the $\alpha,\beta$-ethylenically unsaturated carboxylic acids and olefins mentioned above, are the vinylidene monomers, such as those containing the polymerizable $CH_2=CH<$ grouping. Included in this group are such vinyl monomers as styrene, ortho-, meta- or para-alkyl styrenes such as o-, m- or p-methyl, ethyl, propyl, and butyl styrenes, 2,4-dimethyl styrene, 2,3-dimethyl styrene, 2,5-dibutyl styrene, vinyl naphthenate, acrylonitrile, methacrylonitrile, halo ring or side chain styrenes such as $\alpha$-chlorostyrene, ortho-, meta- or para-chlorostyrenes, 2,4-dibromostyrene, 2,3-difluorostyrene, 2,5-dichlorostyrene, or the alkyl side chain styrenes such as $\alpha$-methylstyrene, $\alpha$-ethyl styrene and the like. Additionally, one may make use of such polymerizable vinyl monomers as acrylamide, methacrylamide, ethacrylamide, N-tertiary butylacrylamide and the like. These polymerizable monomers may be used singly or in combination with one another or may be left out of the polymer component of the novel composition claimed herein entirely.

The polymers, examples of components of which have been enumerated above, used in the composition of the present invention may be prepared by reacting the $\alpha,\beta$-ethylenically unsaturated carboxylic acids or anhydrides with the olefinic hydrocarbons having from about 2 to 8 carbon atoms in proportions which vary over a wide range. For instance, one may use between about 3 mol percent and 50 mol percent of the $\alpha,\beta$-ethylenically unsaturated carboxylic acids to a corresponding 10 mol percent to 50 mol percent of the olefinic hydrocarbons containing 2 to 8 carbon atoms. It is preferred, however, to use a molar excess of the olefinic compound to insure complete reaction between the two monomers. Preferably, one would use 10 to 40 mol percent of the $\alpha,\beta$-ethylenically unsaturated carboxylic acids to about 60 to 90 mol percent of the olefinic hydrocarbons. When less than a total 50 to 50 mol percent of these two components are utilized, a third component, namely those ethylenically unsaturated compounds copolymerizable with the α,β-ethylenically unsaturated carboxylic acid and olefin, mentioned above, is added to supply the difference, the total amount of monomers being 100 mol percent. Therefore, the range of the third copolymerizable material present in the polymer will be between 0 mol percent and 87 mol percent, preferably 25 mol percent to 70 mol percent.

The polymerization reaction is carried out at temperatures of from about 40° C. to about 200° C., preferably 75° C. to about 150° C. at pressures of atmospheric to superatmospheric, depending upon the temperature used, since the olefins used are normally gaseous. Sufficient pressure should be used to assure reaction of the monomers in the reaction vessel.

The reaction is carried out in the presence of from about 0.1 to about 5.0 percent, preferably 0.5 percent to 2.0 percent, of a suitable polymerization catalyst. The catalysts which may be used include peroxide catalysts such as benzoyl peroxide, cumene hydroperoxide, t-butylhydroperoxide, ditertiary butyl peroxide, acetyl peroxide, caproyl peroxide, t-butyl perbenzoate, and the like.

As mentioned above, various esters of the α,β-ethylenically unsaturated carboxylic acids, constituting the second components of the polymer, may also be incorporated into the polymer used in preparing the composition of the present invention. These esters may be added, as such, to the monomer mixture undergoing polymerization or the polymer itself may be esterified after polymerization by reacting the polymer, already containing a plurality of carboxyl groups resulting from the α,β-ethylenically unsaturated carboxylic acid, with an alcohol to form esters thereof.

The esterification, in a process of the latter type, may be conducted by contacting the polymer with an aliphatic monohydric alcohol having from about 1 to 12 carbon atoms. It is possible to use both straight and branched chain alcohols for this purpose.

The temperature maintained during the esterification reaction is within a range of from about 60° C. to about 250° C., preferably 90° C. to 175° C. at atmospheric pressure, although higher or lower pressures may be used.

The reaction between the polymer and the alcohol is allowed to continue until water begins to come off during the reaction. If the acid groups in the polymer are in the anhydride form, the first 50% of the esterification does not result in the production of a substantial amount of water, but equivalent quantities of water are formed during any esterification over about 50%. The amount of esterification completed can be calculated by taking samples of the reaction mixture and titrating to determine the amount of acid (carboxyl groups) left in the sample. It is preferred that the copolymer be about 50% to about 90% esterified in the practice of the present invention. It is possible however, to have up to about 97% esterification. The percent esterification necessary in each specific instance depends upon the alcohol used in the esterification, since the alcohol influences the water-solubility of the final polymer. That is to say, long chain alcohols, when reacted with the acid containing polymer, result in a lowering of the water-solubility of the final product. It must be remembered however, that the presence of an ester in the polymer chain is not essential since, as mentioned above, it is possible that only carboxylic acid and olefin monomers be used to prepare the polymer.

The esterification reaction is preferably carried out in the presence of any known esterification catalyst, since polymers having over 50% esterification are produced more easily thereby. Generally, acidic catalysts such as p-toluene sulfonic acid and the like are used for this purpose in percentages of from about 0.1 to 3.0 percent, based on the total weight of monomer utilized.

Examples of alcohols which may be used to esterify the polymers include methanol, ethanol, propanol, butanol, amyl alcohol, hexyl alcohol, heptyl alcohol, octyl alcohol, nonyl alcohol, decyl alcohol, undecyl alcohol, dodecyl alcohol, mixtures thereof and the like.

The polymers used in the present invention after production, are rendered water-soluble by reaction with any material which will form a water-soluble salt thereof. Generally, any volatile basic material, such as amines and nitrogen containing bases, may be utilized for the purpose. Examples of such volatile basic materials are ammonium hydroxide, methyl amine, ethyl amine, propyl amine, isopropyl amine, dimethyl amine, diethylamine, dipropyl amine, diisopropyl amine, trimethyl amine, triethyl amine, ethanol amine, propanol amine, diethanol amine, dipropanol amine, triethanol amine, 1-amino-2,3-dihydroxy propane, trisisopropanol amine, morpholine and the like.

The amount of volatile basic material used to produce the water-soluble salts of the polymers may be varied over a fairly wide range. That is to say, generally the reaction of the basic material with the polymer is only allowed to continue until the polymer is water-soluble. Any given polymer may require more or less treatment with the volatile basic material to render it water-soluble than another polymer. For instance, one may use a sufficient amount of volatile basic material to form the half salt by using ½ mol equivalent of the volatile compound per mol of carboxyl groups available in the polymer and thereby produce a water-soluble polymer. However, one may have to use a full mol equivalent of volatile compound per mol equivalent of carboxyl groups present in a different polymer to produce a water-soluble polymer thereof. Furthermore, one could use an excess of volatile compound to insure complete salt formation in amounts up to and even exceeding 4 mol equivalents of volatile compound per mol of carboxyl groups present in the polymer. However, the quantity between 1 and 2 mol equivalents of the carboxyl groups is preferred.

As the second principal component of the novel composition of the present invention, one will use the water-soluble potentially thermosetting polymethyl ethers of polymethylol melamines. The polymethyl ether will encompass the dimethyl ether, the trimethyl ether, the tetramethyl ether, the pentamethyl ether, and the hexamethyl ether of a polymethylol melamine. In preparing the polymethylol melamines, one must react at least 2 mols of formaldehyde, and preferably at least 3 mols of formaldehyde, with each mol of melamine under known reaction conditions in order to produce a water-soluble polymethylol melamine, such as trimethylol melamine and the like. The preferred methyl ether of polymethylol melamine is the hexamethoxy hexamethylol melamine.

The ratio of the water-soluble potentially thermosetting polymethyl ether of polymethylol melamine to the water-soluble salt of the polymer may be varied over a fairly wide range. For instance, one may use between about 10% to about 50% by weight of the methylol melamine material to a corresponding 90% to 50% by weight of the water-soluble polymer.

In order to prepare the coatings and films from the novel composition of the present invention, one may cast the composition on a suitable substrate such as glass, sheet steel and the like and bake the resulting supported film at a temperature of from about 100° C. to 250° C. for from about 5 to 45 minutes in the presence of a water-soluble or water-dispersible catalyst.

The catalyst used may be any of the conventional catalysts, many of which have been disclosed in the prior art, and of which p-toluene sulfonic acid is exemplary. The amount of catalyst may vary over a wide range, as the prior art clearly teaches, however, it is preferred that from about 0.1% to 3.0%, based on the weight of the melamine component in the composition, be utilized.

The compositions of the present invention have a considerable number of advantages over the prior art compositions particularly when they are used as coatings.

In addition to the already mentioned advantage of not presenting a fire hazard threat, the compositions of the present invention are of very low toxicity, as the solvent, water, is far less toxic than prior art solvents such as xylol and mineral spirits. Additionally, the compositions of the present invention are far more economically feasible than their organic solvent counterparts and therefore they are more desirable for use in industry from an economical standpoint.

In addition, the compositions of the present invention are far superior to various prior art coating compositions as can be seen from Example 1, set forth hereinbelow.

In order that the present invention may be more completely understood, the following examples are set forth. These examples are for purposes of illustration only and are not to be construed as limitations on the present invention except as set forth in the appended claims. All parts and percentages are by weight unless otherwise indicated.

EXAMPLE 1

30 parts of acrylic acid, 85 parts of butyl acrylate, 85 parts of isobutylene, 200 parts of tetrahydrofuran and 4 parts of benzoyl peroxide are charged into a suitable reaction vessel equipped with stirrer, thermometer and reflux condenser. The reaction is heated to 100° C. for 6 hours. The resulting solution is evaporated to 85% solids at reduced pressure and 137 parts of this solution are dissolved in a mixture of 18.3 parts of 30% aqueous $NH_4OH$, and 135 parts of water. 20 parts of the resulting solution are then blended with 2.7 parts of hexakis (methoxy methyl)melamine and 0.2 parts of 50% aqueous para-toluene sulfonic acid. This blend is then cast on a glass plate and baked 30 minutes at 150° C. A clear, glossy film having superior properties results.

The coating of Example 1 was compared with a coating produced from a commercially available coating composition. The results are shown in Table I.

Table I

| | Coating of Example 1 | A Commercially Available Water-Soluble Coating |
|---|---|---|
| 60° Gloss | 84 | 73. |
| Sward Hardness | 32 | 24. |
| Chemical Resistances: | | |
| Xylene | 2-3 min | Less than 1 min. |
| 50% Acetic Acid | 20-30 min | 3-4 min. |
| 5% Sodium Hydroxide | More than 4 hours. | 60-90 min. |
| Front Impact Resistance (in.-lbs.) | 20-21 | 13-14. |
| Rear Impact Resistance (in.-lbs.) | 16-18 | 3-4. |
| Flexibility [1] | Excellent | Very good. |

[1] On bending 180° over ⅛″ rod.

These tests were run on pigmented films cast on metal and cured 30 minutes at 150° C.

EXAMPLE 2

30 parts of maleic anhydride and 1.5 parts of benzoyl peroxide, dissolved in 170 parts of xylene are charged into a suitable reaction vessel. Ethylene is then charged into the vessel and the reaction mixture is heated to a temperature of about 100° C. After about 10 minutes the temperature is raised to about 150° C. and the reaction is allowed to continue at this temperature for about an hour. The reaction mixture is then cooled and filtered to recover the desired copolymer. 40 parts of the maleic anhydride-ethylene interpolymer are recovered.

EXAMPLE 3

63 parts of the ethylene-maleic anhydride copolymer produced in Example 2 are refluxed for 9 hours in 185 parts of n-butanol. The unreacted butanol is then stripped off and a light yellow clear material of 88% solids is recovered. This material is a butyl ester of a maleic anhydride-ethylene polymer having an acid number of 69. The glass is then dissolved in water containing ammonium hydroxide in order to produce the ammonium salt of the esterified copolymer. 14½ parts of the resulting solution are blended with 1.7 parts of hexamethoxyhexamethylol melamine and 0.1 part of a 50% aqueous solution of p-toluene sulfonic acid. The resulting blend is cast on glass and heated 30 minutes at 150° C. The resulting film is clear, hard and glossy and has a chemical resistance as shown in Table II below.

Table II

CHEMICAL RESISTANCE OF THE BAKED FILM OF EXAMPLE 2

| Chemical: | Time of resistance |
|---|---|
| 50% acetic acid | 3 to 5 hours. |
| 5% sodium hydroxide | 2 to 3 hours. |
| Xylene | Greater than 2 weeks. |

EXAMPLE 4

Into a suitable reaction vessel is charged 127 parts of the ethylene-maleic anhydride copolymer produced in Example 2 and 148 parts of n-butanol. The mixture is heated to about 120° C. and 0.27 part of p-toluene sulfonic acid are added with stirring. Water begins to collect in about ½ hour and when 5.2 parts of water has been collected a sample of this is taken for analysis. The acid number shows the degree of esterification to be 71%. A solution of 93 parts of 15 M ammonium hydroxide in 77 parts of water is slowly added to the esterified polymer at 50° C. Upon stirring for 15 minutes a clear, viscous solution containing 49% solids is observed. 93 parts of this clear, viscous solution is then blended with 15 parts of hexamethoxyhexamethylol melamine and 0.60 part of 50% aqueous p-toluene sulfonic acid solution. This blend, a clear solution, is cast on glass to form a 0.003 inch film and is then baked in a forced draft oven at 150° C. for 30 minutes. The resulting film is hard and clear with good adhesion and chemical resistance.

EXAMPLE 5

The procedure of Example 4 is again followed except that 148 parts of hexanol is substituted for the butanol. Upon esterification, salt-formation and blending with hexamethoxyhexamethylol melamine, a clear, glossy film is produced on heating the blend to 150° C. for 30 minutes.

EXAMPLE 6

65 parts of itaconic acid, 6.4 parts of di-t-butyl peroxide (dissolved in 300 parts of tetrahydrofuran) and 256 parts of isobutylene are charged into an autoclave. The mixture is heated to a temperature of 130° C. After 4½ hours the autoclave is cooled. The solvent is stripped from the reaction mixture at reduced pressure. Seventy-three parts of a solid product were recovered.

Forty parts of this polymeric product is then dissolved in 50 parts of water containing 15 parts of triethanol amine in order to produce a water-soluble salt thereof. 30 parts of the resulting solution are then blended with 5.0 parts of tetramethoxytetramethylol melamine and 0.1 part of p-toluene sulfonic acid.

This blend is then cast on sheet steel and heated 27 minutes at 165° C. The resulting film is very hard and glossy.

EXAMPLE 7

Forty-nine parts of maleic anhydride, 56 parts of di-isobutylene, 210 parts of toluene and 3.15 parts of benzoyl peroxide were charged into a flask equipped with reflux condenser and stirrer, and heated to 110° C. After 2 hours at this temperature, the solution was allowed to cool, then poured into an equal volume of hexane. The white solid which separated was filtered off and dried under vacuum at 100° C. Sixty-two parts of dried product were recovered.

Thirty parts of this material were dissolved in 70 parts of a 1:1 mixture of water and 15 M ammonium hydroxide. To the solution were added 20 parts of hexamethoxyhexamethylol melamine and 0.4 part of p-toluene sulfonic acid. A film was cast from this mixture on glass and cured 20 minutes at 175° C. A hard film resulted.

It will be quite apparent to those skilled in the art that various pigments may be incorporated into the coating composition before baking to produce a broad variety of colored enamels or, if desired, pigments, dyes or other coloring materials may be omitted altogether in order to produce clear, transparent finishes.

With certain pigments, it may be desirable, and sometimes advantageous, to use them in the form of aqueous slurries since, in the course of their preparation, they are generally obtained in admixture with varying amounts of water as a result of filtration. For use with organic solvents, these pigments must be thoroughly dried, but when an aqueous solvent is involved, the drying step is unnecessary.

The use of hexamethyl ether of hexamethylol melamine as the second component of the composition of the instant invention is preferred over a less highly substituted melamine since greater storage stability of the blend results.

We claim:

1. A composition of matter capable of producing glossy, continuous films having excellent chemical resistance which comprises a mixture of (1) 50% to 10% by weight of a water-soluble potentially thermosetting polymethyl ether of a polymethylol melamine and (2) 50% to 90% by weight of a water-soluble salt of a polymer comprising (a) 3 mol percent to 50 mol percent of an $\alpha,\beta$-monoethylenically unsaturated carboxylic acid, (b) 10 mol percent to 50 mol percent of a monoolefin having 2 to 8 carbon atoms and (c) up to 87 mol percent of a monoethylenically unsaturated monomer different from (a) and (b) and copolymerizable with (a) and (b).

2. A composition of matter capable of producing glossy, continuous films having excellent chemical resistance comprising a mixture of (1) 50% to 10% by weight of a water-soluble potentially thermosetting polymethyl ether of a polymethylol melamine and (2) 50% to 90% by weight of a water-soluble salt of a polymer comprising (a) 3 mol percent to 50 mol percent of an $\alpha,\beta$-monoethylenically unsaturated monocarboxylic acid, (b) 10 mol percent to 50 mol percent of a monoolefin having 2 to 8 carbon atoms and (c) up to 87 mol percent of an alkyl ester of an $\alpha,\beta$-ethylenically unsaturated monocarboxylic acid.

3. A composition of matter capable of producing glossy, continuous films having superior properties comprising a mixture of (1) 50% to 10% by weight of a water-soluble potentially thermosetting polymethylether of a polymethylol melamine and (2) 50% to 90% by weight of a water-soluble salt of a polymer comprising (a) 3 mol percent to 50 mol percent of an $\alpha,\beta$-monoethylenically unsaturated polycarboxylic acid (b) 10 mol percent to 50 mol percent of a monoolefin having 2 to 8 carbon atoms and (c) up to 87 mol percent of alkyl ester of an $\alpha,\beta$-ethylenically unsaturated monocarboxylic acid.

4. A composition of matter capable of producing glossy, continuous films having excellent chemical resistance comprising a mixture of (1) 50% to 10% by weight of a water-soluble potentially thermosetting polymethyl ether of a polymethylol melamine and (2) 50% to 90% by weight of a water-soluble salt of a polymer comprising (a) 3 to 50 mol percent of maleic anhydride (b) 10 to 50 mol percent of a monoolefin having from 2 to 8 carbon atoms and (c) up to 87 mol percent of a monoethylenically unsaturated monomer different from (a) and (b) and copolymerizable with (a) and (b).

5. A composition of matter capable of producing glossy, continuous films having superior properties comprising a mixture of (1) 50% to 10% by weight of a water-soluble potentially thermosetting polymethyl ether of a polymethylol melamine and (2) 50% to 90% by weight of a water-soluble salt of a polymer comprising (a) 3 mol percent to 50 mol percent of acrylic acid (b) 10 mol percent to 50 mol percent of isobutylene and (c) up to 87 mol percent of butyl acrylate.

6. A composition of matter capable of producing glossy, continuous films of superior properties comprising a mixture of (1) 50% to 10% by weight of the hexamethyl ether of hexamethylol melamine and (2) 50% to 90% by weight of a water-soluble salt of a polymer comprising (a) 3 mol percent to 50 mol percent of acrylic acid (b) 10 mol percent to 50 mol percent of isobutylene and (c) up to 87 mol percent of butyl acrylate.

7. A composition of matter capable of producing glossy, hard continuous films of increased chemical resistance comprising a mixture of (1) 50% to 10% by weight of a water-soluble potentially thermosetting polymethyl ether of a polymethylol melamine and (2) 50% to 90% by weight of a water-soluble salt of a polymer comprising (a) 3 to 50 mol percent of maleic anhydride (b) 10 to 50 mol percent of ethylene and (c) up to 87 mol percent of an alkyl ester of an $\alpha,\beta$-ethylenically unsaturated carboxylic acid.

8. A composition of matter capable of producing glossy, hard, continuous films having increased chemical resistance comprising a mixture of (1) 50% to 10% by weight of the hexamethyl ether of hexamethylol melamine and (2) 50% to 90% by weight of a water-soluble salt of a polymer comprising (a) 3 to 50 mol percent maleic anhydride (b) 10 to 50 mol percent of isobutylene and (c) up to 87 mol percent of an alkyl ester of an $\alpha,\beta$-ethylenically unsaturated carboxylic acid.

9. A composition of matter capable of producing glossy, hard, continuous films having increased chemical resistance comprising a mixture of (1) 50% to 10% by weight of the hexamethyl ether of hexamethylol melamine and (2) 50% to 90% by weight of a water-soluble salt of a polymer comprising (a) 10 to 40 mol percent of monobutyl maleate (b) 50 mol percent of isobutylene and (c) 40 to 10 mol percent of dibutyl maleate.

References Cited by the Examiner

UNITED STATES PATENTS

| | | | |
|---|---|---|---|
| 2,536,050 | 1/51 | Fluck | 260—855 |
| 2,906,724 | 9/59 | Daniel | 260—855 |
| 3,021,295 | 2/62 | Saxon et al. | 260—856 |
| 3,107,227 | 10/63 | Sven et al. | 260—856 |
| 3,118,852 | 1/64 | Christenson et al. | 260—855 |

MURRAY TILLMAN, *Primary Examiner.*

LEON J. BERCOVITZ, *Examiner.*